(12) United States Patent
Bhirud et al.

(10) Patent No.: US 10,491,626 B1
(45) Date of Patent: Nov. 26, 2019

(54) DYNAMICALLY RANKING AND PRESENTATION OF ENDPOINTS BASED ON AGE OF SYMPTOMS AND IMPORTANCE OF THE ENDPOINT IN THE ENVIRONMENT

(71) Applicant: Symantec Corporation, Mountain View, CA (US)

(72) Inventors: Dinesh Bhirud, Long Beach, CA (US); Nobuto Hotta, Torrance, CA (US); Douglas Schlatter, Playa Vista, CA (US); Petrus Johannes Viljoen, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 201 days.

(21) Appl. No.: 15/198,778

(22) Filed: Jun. 30, 2016

(51) Int. Cl.
*H04L 29/06* (2006.01)

(52) U.S. Cl.
CPC ........ *H04L 63/145* (2013.01); *H04L 63/0245* (2013.01); *H04L 63/1425* (2013.01)

(58) Field of Classification Search
CPC .............................. H04L 63/14; H04L 63/1443
See application file for complete search history.

(56) References Cited

U.S. PATENT DOCUMENTS

| 8,683,598 | B1 | 3/2014 | Cashin | |
| 2004/0143753 | A1* | 7/2004 | Hernacki | H04L 63/14 726/25 |
| 2008/0271143 | A1* | 10/2008 | Stephens | H04L 41/5061 726/22 |
| 2014/0013435 | A1* | 1/2014 | Palumbo | G06F 21/56 726/24 |
| 2014/0173071 | A1* | 6/2014 | Hazen | H04L 63/0876 709/223 |
| 2015/0264061 | A1* | 9/2015 | Ibatullin | H04L 63/145 726/23 |

OTHER PUBLICATIONS

PCT Search Report and Written Opinion dated Jun. 27, 2017, PCT/US2017/029688.

* cited by examiner

*Primary Examiner* — Jason K Gee
(74) *Attorney, Agent, or Firm* — Patterson + Sheridan, LLP (57) ABSTRACT

The present disclosure provides methods for an endpoint ranking system that can take endpoint importance, symptom importance, and symptom timing into account when determining endpoint hygiene scores for endpoints in a network. A list of endpoints that is ranked or sorted according to hygiene score can by dynamically generated and can change over time due to the manner in which symptom timing is taken into account. The list can also evolve as parameters for endpoint importance and system importance are modified. An endpoint-importance weight can be assigned to each endpoint to bias hygiene scores according to endpoint importance. Symptom-importance weights and decay rates can also be assigned to symptom types to further bias hygiene scores.

18 Claims, 10 Drawing Sheets

Threat Protection

| | | |
|---|---|---|
| OS Types | All OS Types ▼ | |
| IPS Events | With or without IPS Events ▼ | |
| Suspicious Files | With or without Suspicious Files ▼ | |
| By Group | All Groups ✎ Edit | |

| Endpoint | OS Name | Suspicion Rank | Group | User | Suspicious Files | IPS Events |
|---|---|---|---|---|---|---|
| srvr-A | Ubuntu 16 | 1 (+3) | IT | Admin | 5 | 1 |
| dk-PC1 | Windows 7 | 2 (-1) | Workstation | Admin | 3 | 2 |
| dk-PC2 | OS X | 3 (0) | Workstation | Admin | 3 | 1 |
| LPTP01 | Knoppix 4 | 4 (+1) | Workstation | Admin | 0 | 0 |
| tv-01 | Orsay | 5 (+2) | IT | Admin | 1 | 0 |
| PDA27 | Palm | 6 (-4) | Mobile | Admin | 2 | 3 |
| smph01 | Android | 7 (+1) | Mobile | Admin | 1 | 0 |
| tblt01 | iOS | 8 (+1) | Mobile | Admin | 8 | 5 |
| smph02 | Blackberry | 9 (+1) | Mobile | Admin | 4 | 6 |
| fph-01 | Symbian | 10 (-4) | Mobile | Admin | 0 | 0 |

Refresh    Page [1] of 1    Items per page: [25 ▼]

DYNAMICALLY RANKING AND PRESENTATION OF ENDPOINTS BASED ON AGE OF SYMPTOMS AND IMPORTANCE OF THE ENDPOINT IN THE ENVIRONMENT

BACKGROUND

Field

The present disclosure relates to a system for ranking endpoints in a network according to suspicion scores. More specifically, the present disclosure provides techniques for dynamically ranking network endpoint devices using suspicion scores that are based on symptom age and endpoint.

Description of the Related Art

Many types of malware can spread from one endpoint device to another over a computer networks. Hence, it is typically prudent to implement security measures in a network to protect endpoint devices from malware infections. An infected endpoint device may exhibit certain symptoms as a result of the malware infection. The term "endpoint device" generally refers to a hardware device through which a user can access a network (e.g., a transmission control protocol/Internet protocol (TCP/IP) network). Desktop computers, laptops, smart phones, tablets, thin clients, printers, and other specialized hardware such as point-of-sale (POS) terminals are a few examples of endpoint devices.

Some examples of symptoms that may indicate a malware infection include storing suspicious files, modifying certain files (e.g., hidden system files), deleting certain files, changing registry entries, running suspicious processes, playing sounds under unusual circumstances, opening dialog boxes, receiving suspicious messages over the network, freezing, crashing, running slowly in general, disabling certain types of applications (e.g., antivirus programs), creating new desktop icon without user consent, changing system security settings, opening or closing programs without user consent, sending emails to multiple recipients without user approval, showing pop-up advertisements, changing a default search engine without user approval, installing new toolbars in a web browser, executing macros, redirecting to a web page other than a web page indicated by a link that is clicked, increasing the number of processes that are running, disabling a firewall, or changing a hard drive's name or a volume's name.

DETAILED DESCRIPTION

Embodiments presented herein provide techniques for an endpoint ranking system that can take endpoint importance, symptom importance, and symptom timing into account when determining endpoint scores for endpoints in a network. An endpoint ranker can generate and sort a list of endpoints according to suspicion score. Over time, the list may dynamically evolve due to the manner in which symptom timing is taken into account. The list can also evolve as parameters for endpoint importance and system importance are modified.

For example, in some embodiments, an endpoint-importance weight can be assigned to each endpoint in a network. The endpoint-importance weight may be defined manually (e.g., by a domain expert) or by a predefined function. Symptom-importance weights can also be assigned to symptom types. In addition, decay rates can be assigned to symptom types. Like the endpoint-importance weight, the symptom-importance weights and the decay rates may be defined manually or by a predefined function. An endpoint's score (i.e., suspicion score) at a given time can be calculated based on a sum of the contributions from the symptom types, where each contribution's symptom type is weighted by the symptom-importance weight associated with the symptom type. In addition, each contribution of an individual symptomatic event can be exponentially decayed using the decay rate for the event's symptom type based on the amount of time that has elapsed since the symptomatic event occurred.

Figure 1:
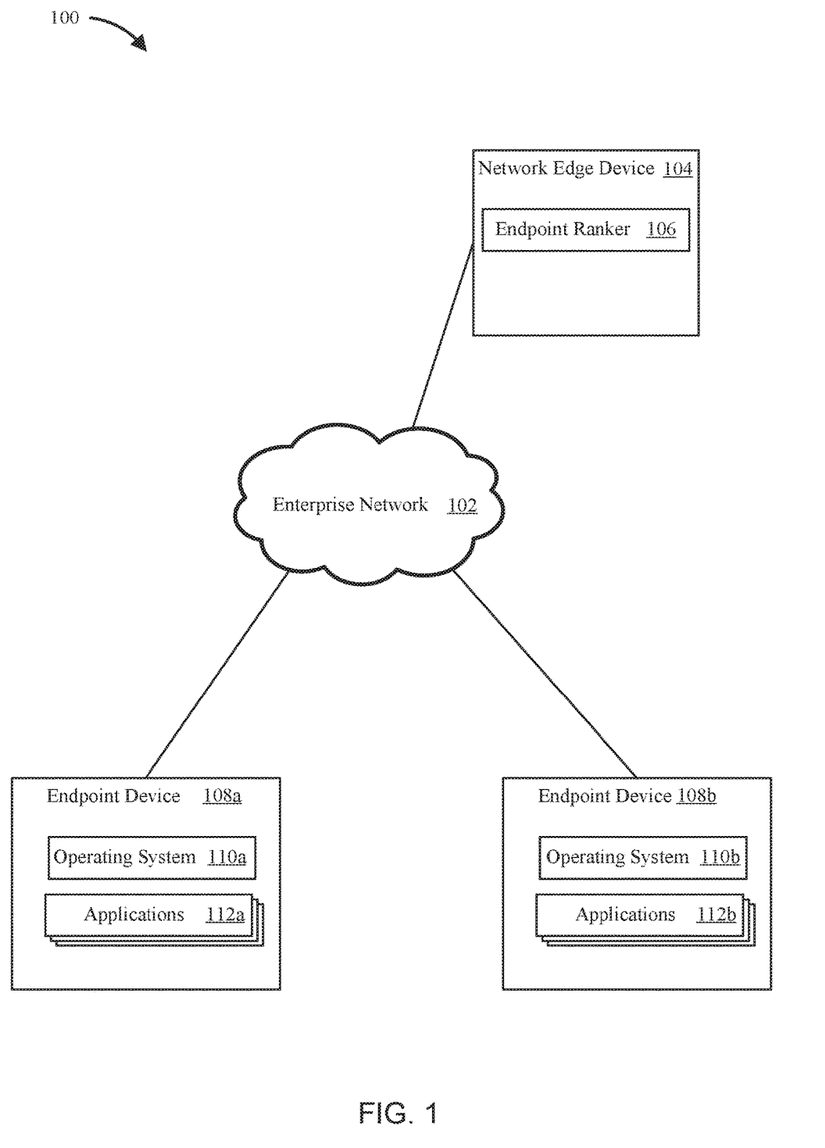
FIG. 1 illustrates an example computing environment that may be used to apply techniques of the present disclosure, according to one embodiment.

FIG. 1 illustrates a computing environment 100 that may be used to apply techniques of the present disclosure, according to one embodiment. A network edge device 104 and endpoint devices 108*a-b* are connected to an enterprise network 102. The network edge device 104 may be, for example, a router, a routing switch, an integrated access device (IAD), or some other type of device that provides an entry point into the enterprise network 102. The operating system 110*a* runs on endpoint device 108*a*, while the operating system 110*b* runs on endpoint device 108*b*. Applications 112*a* run on endpoint device 108*a*, while applications 112*b* run on endpoint device 108*b*. An endpoint ranker 106 runs on the network edge device 104.

The operating systems 110*a-b* can monitor information about the applications 112*a-b*, respectively. The endpoint devices 108*a-b* can report data that is gathered by such monitoring (i.e., telemetry data) to the endpoint ranker 106. The data can include, for example, events indicating that the endpoint device at which the events occurred is infected with malware (i.e., symptomatic events). Timestamps at which the events occurred can also be reported to the endpoint ranker 106.

The endpoint ranker 106 can determine a suspicion scores for each of the endpoint devices 108*a-b* based on the telemetry data. Each reported event can contribute to the suspicion score for the device on which the event occurred.

An event's contribution can be reduced based on the amount of time that has elapsed since the event occurred. The endpoint ranker 106 can make a list of the endpoint devices 108a-b that is sorted by suspicion score. The list can be updated automatically at regular intervals, since the suspicion scores for the endpoint devices can change over time as new symptomatic events occur and contributions of older symptomatic events to suspicion scores decrease.

Figure 2:
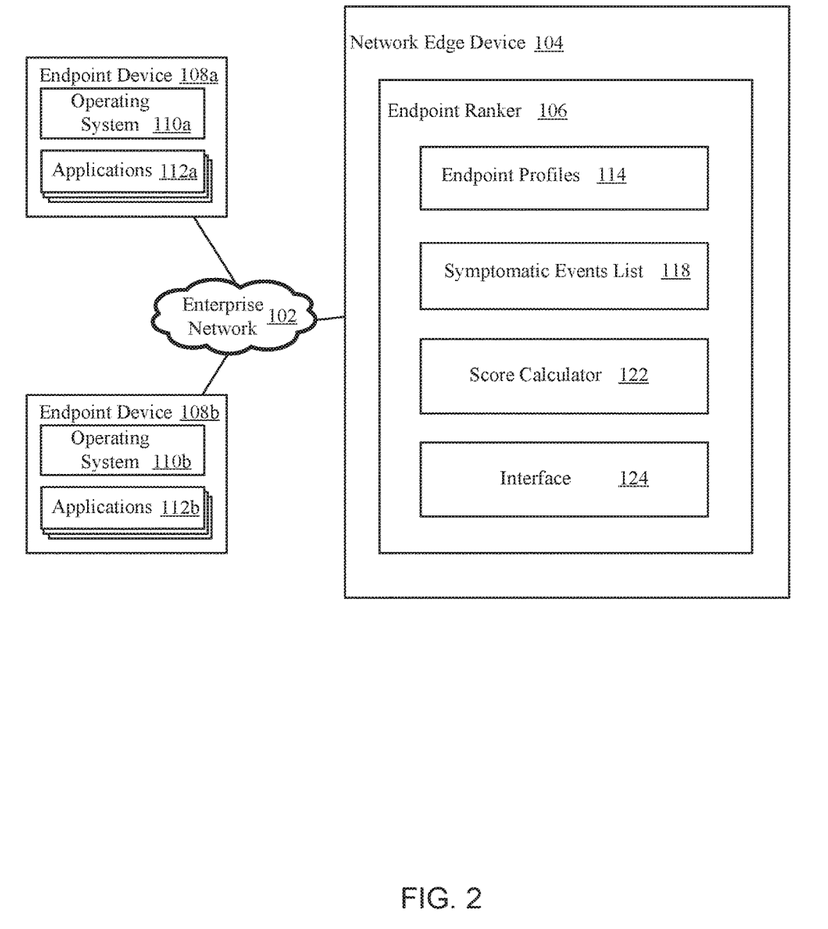
FIG. 2 illustrates an example detailed view of a network edge device and an endpoint ranker, according to one embodiment.

FIG. 2 illustrates a more detailed view of the network edge device 104 and the endpoint ranker 106, according to one embodiment. The endpoint ranker 106 can include endpoint profiles 114, symptomatic events list 118, score calculator 122, and interface 124. The endpoint profiles 114 can include an endpoint profile for each endpoint in the enterprise network 102. Hence, the endpoint profiles 114 include an endpoint profile for the endpoint device 108a and an endpoint profile for the endpoint device 108b, as shown. While the example shown in FIG. 2 only shows two endpoint devices connected to the enterprise network 102, it should be understood that greater numbers of endpoint devices can be present.

The symptomatic events list 118 can include an event record for each symptomatic event reported to the network edge device 104 by endpoint devices 108a-b. The score calculator 122 can calculate the suspicion scores for the endpoint devices 108a-b based on the endpoint profiles 114 and the symptomatic events list 118. The interface 124 may be a graphical user interface (GUI), a command-line interface, or some other type of interface that allows a user with administrative privileges to edit the endpoint profiles 114 and the score calculator 122.

In one embodiment, the suspicion score can be a weighted average of time-decaying contributions of symptoms that have occurred at the endpoint device. To provide a more formal definition in accordance with this example, let the letter j represent an integer index and let $E_j$ represent the $j^{th}$ endpoint in a network. Also, let Score($E_j$) represent the suspicion score for the endpoint $E_j$.

Furthermore, let $W_j$ represent a weight assigned to the endpoint $E_j$ that indicates how important the endpoint $E_j$ is. The weight $W_j$ can be manually provided (e.g., by a user) or can be defined based on the operating system and the applications running on the endpoint $E_j$. In general, the weight $W_j$ increases as the importance of the endpoint $E_j$ increases. In other words, a relatively high value of the weight $W_j$ indicates high importance for the endpoint $E_j$, while a relatively low value of the weight $W_j$ indicates low importance for the endpoint $E_j$.

In addition, let i represent an integer index of a symptom type, where there are n total symptom types. Let t represent the timestamp for an event of a given symptom type. Also, let $N_{j,i,t}$ refer to the un-decayed, unweighted contribution of an event of the $i^{th}$ symptom type that occurred at timestamp t on the $j^h$ endpoint (i.e., endpoint $E_j$). The decayed contribution of all events of the $i^{th}$ symptom type that have occurred on endpoint $E_j$ can be represented by $f_i(E_j)$, where $f_i(E_j)$ is defined by the equation $$f_i(E_j) = \sum_{\forall t} e^{-\beta_i \cdot (\tau - t)} \cdot N_{j,i,t},$$

where $\beta_i$ is the rate of decay for the $i^{th}$ symptom type and $\tau$ is a reference time at which the suspicion score for the endpoint $E_j$ is being calculated. In other words, $\tau$-t represents the amount of time that has elapsed since the timestamp t. The notation $\forall t$ means that the summation is over all timestamps at which events of the $i^{th}$ symptom type occurred. (If multiple events of the $i^{th}$ symptom type occur at exactly the same time, the summation can redundantly use the same timestamp for each of the multiple events so that all of the multiple events contribute to the summation accordingly). The rate of decay $\beta_i$ can be manually defined, if desired, or determined using a predefined function.

In addition to the weight $W_j$ that is assigned to the endpoint $E_j$, weights can be assigned to symptom types. Let $W_i$ represent a weight assigned to the $i^{th}$ symptom type. In addition, let Z represent a normalization component that may be defined by the equation $$Z = \sum_{i=1}^{n} W_i,$$

where there are n total symptom types (n is therefore a non-negative integer).

Given the definitions above for this example, the suspicion score Score($E_j$) for the endpoint $E_j$ can be defined by the equation $$\text{Score}(E_j) = \frac{W_j}{Z} \cdot \sum_{i=1}^{n} W_i \cdot f_i(E_j)$$

Thus, the suspicion score Score($E_j$) is dependent on the weight $W_j$ assigned to the endpoint $E_j$. Some symptoms may have a higher weight than others, while some symptoms may have faster decay rates than others. A user with domain knowledge can configure the weights and the decay rates as desired.

Figure 3:
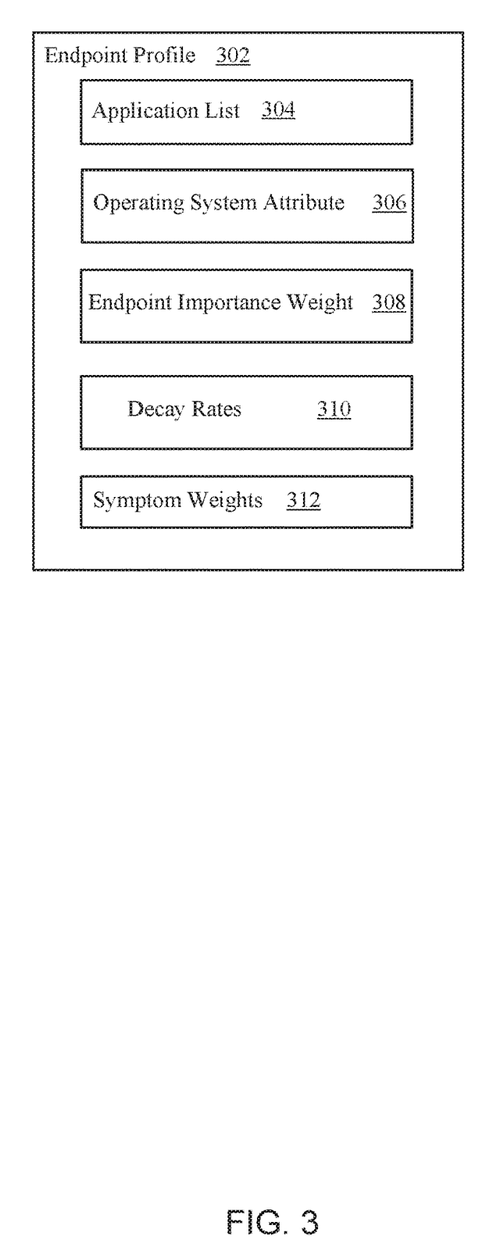
FIG. 3 illustrates a detailed view of an example endpoint profile, according to one embodiment.

FIG. 3 illustrates a detailed view of an endpoint profile 302, according to one embodiment. The endpoint profile 302 can correspond to an endpoint that is connected to an enterprise network. The endpoint profile 302 includes an application list 304 of applications that run on the endpoint and an operating system attribute 306 that identifies an operating system that runs on the endpoint.

Illustratively, the endpoint profile also includes an endpoint importance weight 308 for the endpoint. The endpoint importance weight 308 can be manually defined by a user with administrative privileges. Alternatively, the endpoint importance weight 308 can be defined automatically according to a function. The function may receive input parameters that indicate an operating system running on the endpoint and applications running on the endpoint. An example function might, for example, use a hash that uses operating system names and application names as keys. Each key can be associated with a value in the hash. To determine the endpoint importance weight 308, the function may sum the hash value associated with the name of the operating system running on the endpoint with the hash values associated with names of applications running on the endpoint. This is one example of a function that can be used, but many other functions could be used to determine the endpoint importance weight 308.

The endpoint profile also includes decay rates 310. Each decay rate can be associated with a symptom type. Each symptomatic event that occurs at the endpoint device can also be associated with a symptom type. The contribution of an event to the endpoint's suspicion score can be reduced over time based on the decay rate associated with the symptom type of the event. In some embodiments, a symptomatic event's contribution may decay exponentially based on a decay rate in the decay rates 310. A decay rate can be manually defined by a user with administrative privileges. Alternatively, the decay rate can be defined automatically according to a function. The function may receive input parameters that indicate a stream of events.

The endpoint profile 302 can also include symptom weights 312. Each symptom weight can be associated with a symptom type. The contribution of an event to the endpoint's suspicion score can use a symptom weight associated with the symptom type of the event as a coefficient. A symptom weight can be manually defined by a user with administrative privileges. Alternatively, the symptom weight can be defined automatically according to a function. The function may receive input parameters that indicate a stream of events.

Figure 4:
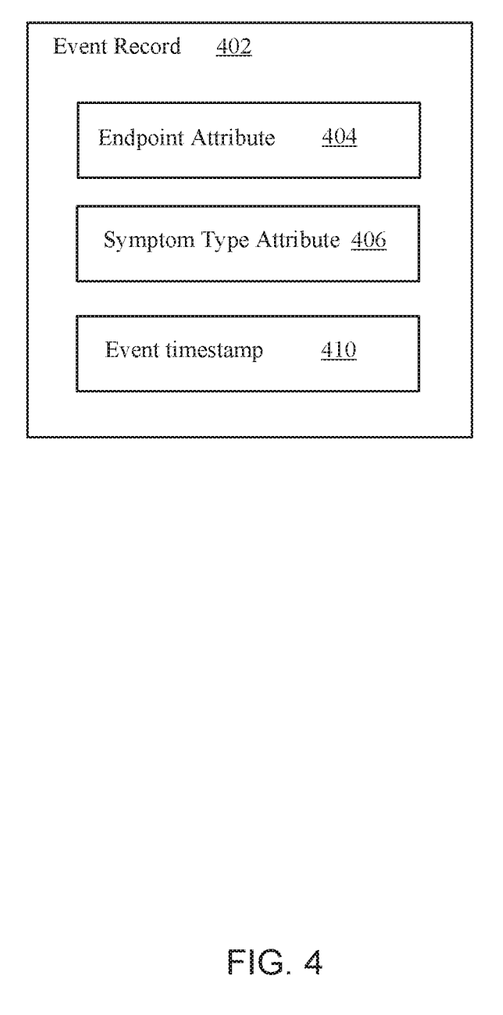
FIG. 4 illustrates a detailed example of an event record, according to one embodiment.

FIG. 4 illustrates a detailed example of an event record 402, according to one embodiment. The event record 402 includes an endpoint attribute 404 indicating the endpoint at which the event occurred. The event record 402 also includes a symptom type attribute 406 indicating a symptom type associated with the event. The event record 402 also includes an event timestamp 410 indicating a time at which the event occurred.

Figure 5A:
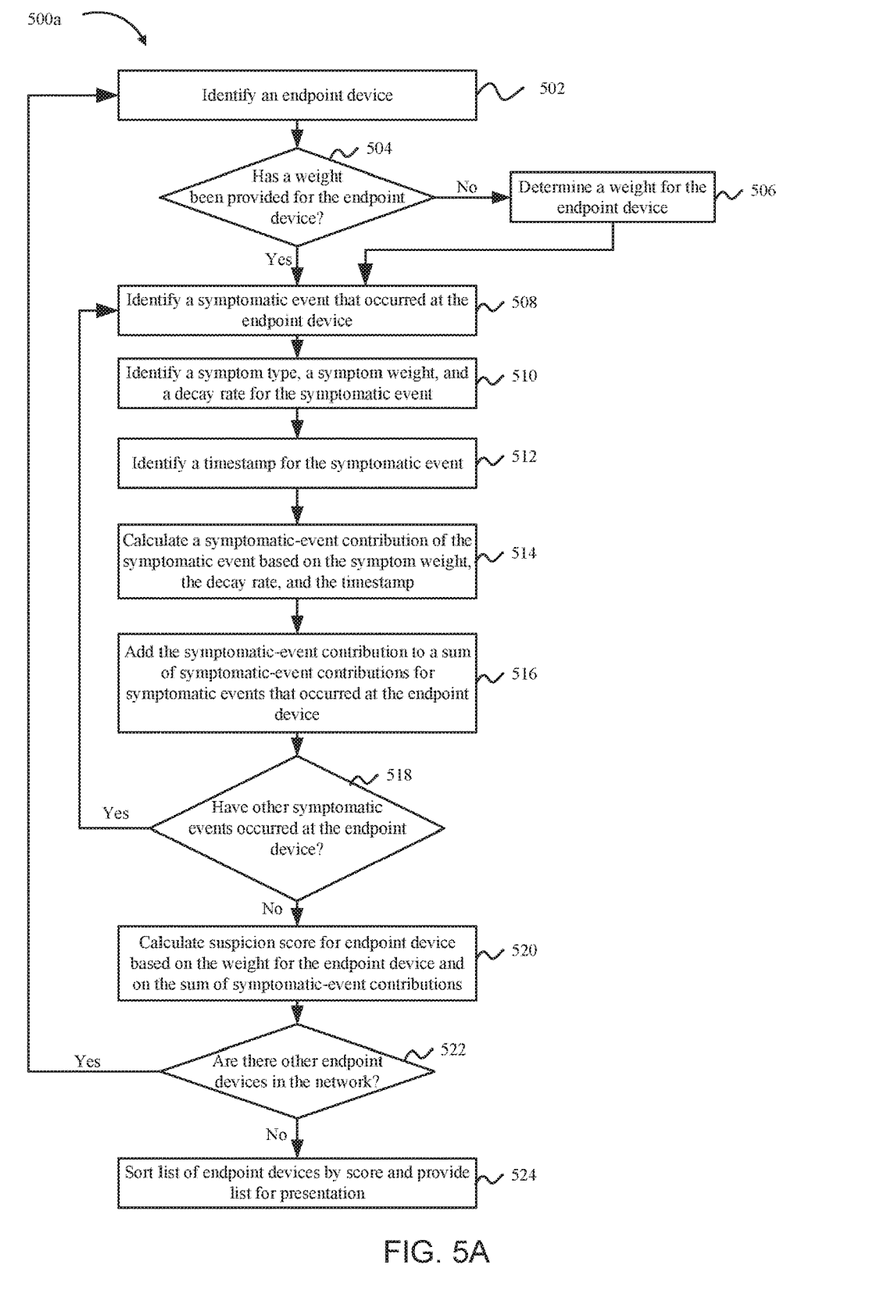
FIG. 5A is a flow diagram illustrating a process for an endpoint ranker program in accordance with an example, according to one embodiment.

FIG. 5A is a flow diagram illustrating a process 500a for an endpoint ranker program in accordance with an example, according to one embodiment. The process 500a can be implemented as a method or can be executed as instructions on a machine (e.g., by one or more processors), where the instructions are included on at least one computer-readable storage medium (e.g., a transitory or non-transitory computer-readable storage medium).

At block 502, an endpoint ranker program identifies an endpoint device in a network. The endpoint device may be associated with an identifier that serves to distinguish the endpoint device from other devices on the network. As in block 504, it can be determined whether an endpoint importance weight has been provided for the endpoint device (e.g., by a user). If no endpoint importance weight has been provided, block 506 can be executed to determine an endpoint importance weight. The endpoint importance weight may be determined, for example, using a function that receives input parameters describing the endpoint (e.g., parameters indicating an operating system and/or applications running on the endpoint device).

At block 508, the endpoint ranker program identifies a symptomatic event that occurred at the endpoint device. As in block 510, a symptom type, a symptom weight, and a decay rate for the symptomatic event can be identified. In some examples, the symptom type, the symptom weight, and the decay rate can be defined in an endpoint profile for the endpoint.

At block 512, the endpoint ranker program identifies a timestamp for the symptomatic event (e.g., in an event record for the symptomatic event). At block 514, the endpoint ranker program calculates a symptomatic-event contribution for the symptomatic event based on the symptom weight, the decay rate, and the timestamp. The symptom weight can, for example, serve as a coefficient and the decay rate can be used to exponentially decay the symptomatic-event contribution based on an amount of time elapsed since the timestamp.

At block 516, the endpoint ranker program adds the symptomatic-event contribution to a sum of symptomatic-event contributions for symptomatic events that occurred at the endpoint device.

At block 518, the endpoint ranker program determines whether any additional symptomatic events have occurred at the endpoint device. If additional symptomatic events have occurred, blocks 508-516 can be repeated for each additional symptomatic event. In some examples, blocks 508-516 can be executed for multiple symptomatic events in parallel (e.g., via multi-threading).

At 520, if there are no additional symptomatic events that have occurred at the endpoint device, the endpoint ranker program calculates a suspicion score for the endpoint device. The suspicion score can be based on the weight for the endpoint device (i.e., the endpoint-importance weight) and based on the sum of the symptomatic-event contributions. In one example, the weight for the endpoint device may be used as a coefficient that is multiplied by the sum of symptomatic-event contributions.

At block 522, the endpoint ranker program determines whether there are any additional endpoint devices in the network for which suspicion scores need to be calculated. If there are, the endpoint ranker program can repeat blocks 502-520 for each additional endpoint device. In some examples, the endpoint ranker program can execute blocks 502-520 for multiple endpoint devices in parallel (e.g., via multi-threading).

At block 524, once suspicion scores have been calculated for the endpoint devices in the network, a list of the endpoint devices can be sorted and provided for presentation.

Figure 5B:
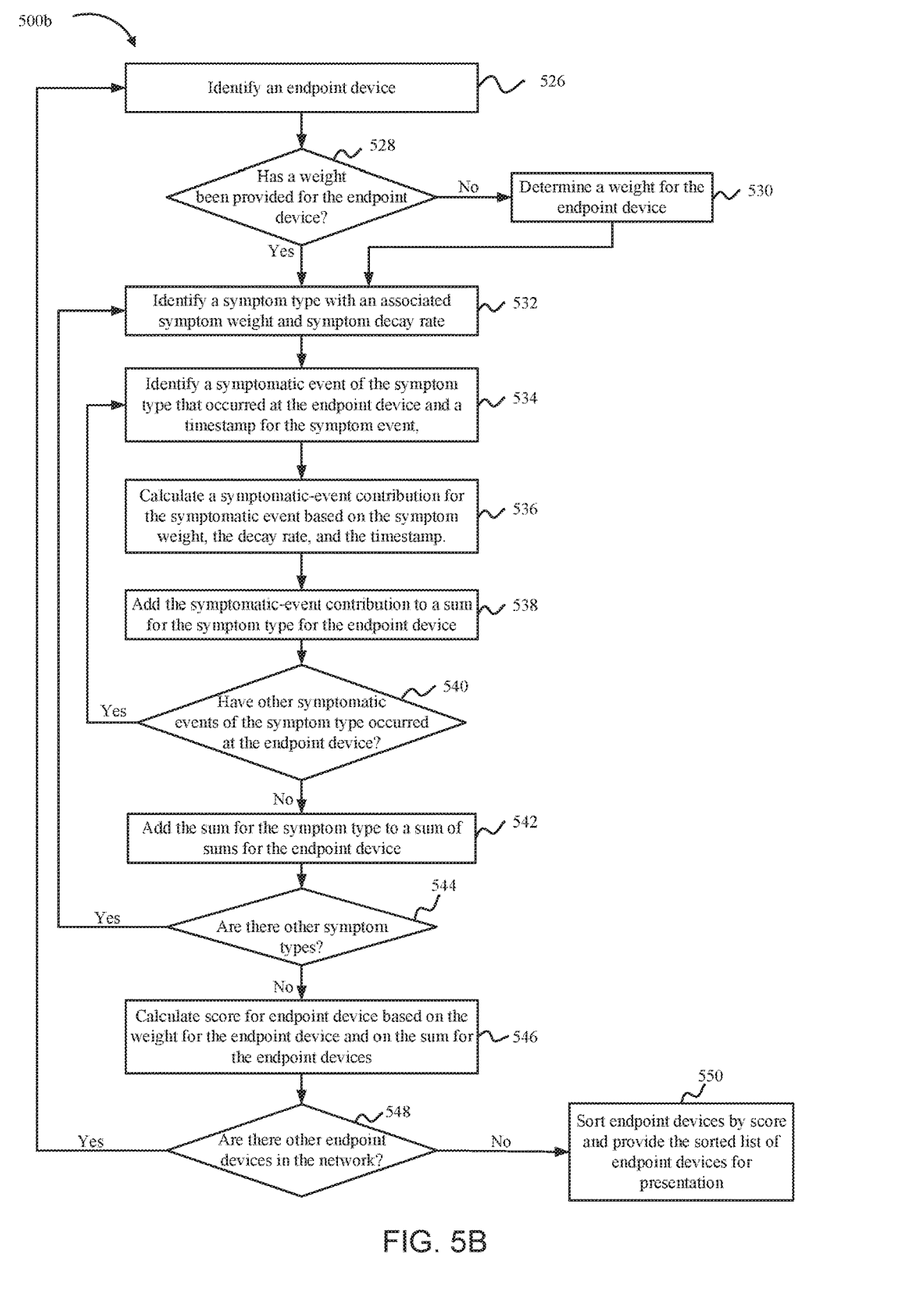
FIG. 5B is another flow diagram illustrating another process for an endpoint ranker program in accordance with an example, according to one embodiment.

FIG. 5B is a flow diagram illustrating a process 500b for an endpoint ranker program in accordance with an example, according to one embodiment. The process 500b can be implemented as a method or can be executed as instructions on a machine (e.g., by one or more processors), where the instructions are included on at least one computer-readable storage medium (e.g., a transitory or non-transitory computer-readable storage medium).

At block 526, an endpoint ranker program identifies an endpoint device in a network. The endpoint device may be associated with an identifier that serves to distinguish the endpoint device from other devices on the network. As in block 528, it can be determined whether an endpoint importance weight has been provided for the endpoint device (e.g., by a user). If no endpoint importance weight has been provided, block 530 can be executed to determine an endpoint importance weight. The endpoint importance weight may be determined, for example, using a function that receives input parameters describing the endpoint (e.g., parameters indicating an operating system and/or applications running on the endpoint device).

At block 532, the endpoint ranker program identifies a symptom type with an associated symptom weight and symptom decay rate. In some examples, the symptom weight and the symptom decay rate can be found in a profile for the endpoint device.

At block 534, the endpoint ranker program identifies a symptom event that is of the symptom type and that occurred at the endpoint device. The endpoint ranker program may also identify a timestamp for the symptom event. In some examples, an event record for the symptomatic event may indicate the symptom type and the timestamp.

At block 536, the endpoint ranker program calculates a symptomatic-event contribution for the symptomatic event. The symptomatic-event contribution can be based on the symptom weight, the decay rate, and the time stamp. The symptom weight can, for example, serve as a coefficient and the decay rate can be used to exponentially decay the symptomatic-event contribution based on an amount of time elapsed since the timestamp.

At block 538, the endpoint ranker program adds the symptomatic-event contribution to a sum for the symptom type. At block 540, the endpoint ranker program determines whether any additional symptomatic events of the symptom type have occurred at the endpoint device. If additional symptomatic events of the symptom type have occurred, the endpoint ranker program can repeat blocks 534-538 for each additional symptomatic event of the symptom type. In some examples, the endpoint ranker program can execute blocks 534-538 for multiple symptomatic events of the symptom type in parallel (e.g., via multi-threading).

At block 542, the endpoint ranker program adds the sum for the symptom type to a sum of the sums for the individual symptom types for the endpoint device. At block 544, the endpoint ranker program determines whether there are any additional symptom types to consider for the endpoint device. In other words, it can be determined whether any symptomatic events that occurred at the endpoint device are associated with any symptom types for which sums have not yet been calculated. If there are additional symptom types to consider, the endpoint ranker program can repeat blocks 532-542 for each additional symptom type. In some examples, the endpoint ranker program can execute blocks 532-542 for multiple symptom types in parallel (e.g., via multi-threading).

At block 546, if there are no additional symptom types, the endpoint ranker program calculates a suspicion score for the endpoint device. The suspicion score can be based on the weight for the endpoint device (i.e., the endpoint-importance weight) and based on the sum of sums for the endpoint device. In one example, the endpoint ranker program uses the weight for the endpoint device as a coefficient that is multiplied by the sum of sums for the endpoint device.

At block 548, the endpoint ranker program determines whether there are any additional endpoint devices in the network for which suspicion scores need to be calculated. If there are, the endpoint ranker program can repeat blocks 526-546 for each additional endpoint device. In some examples, the endpoint ranker program can execute blocks 526-546 for multiple endpoint devices in parallel (e.g., via multi-threading).

At block 550, once suspicion scores have been calculated for the endpoint devices in the network, the endpoint ranker program can create and sort a list of the endpoint devices and provide the list for presentation.

If given identical input, process 500*b* and process 500*a* will generally produce the same suspicion scores for the endpoint devices in a network. However, if process 500*b* is used, the sums for symptom types are available for users who may wish to inspect how much symptom events of a specific symptom type are contributing to the total suspicion score.

In addition, in some embodiments, the endpoint ranker program can block endpoint devices that have suspicion scores exceeding a certain threshold from performing suspicious actions. A suspicious action can be an action that, if performed, would result in a symptomatic event. The endpoint ranker program can block a suspicion action by signaling an endpoint device not to perform the action or by refusing to allow the endpoint device to use some resource that is needed to complete the action.

Figure 6:
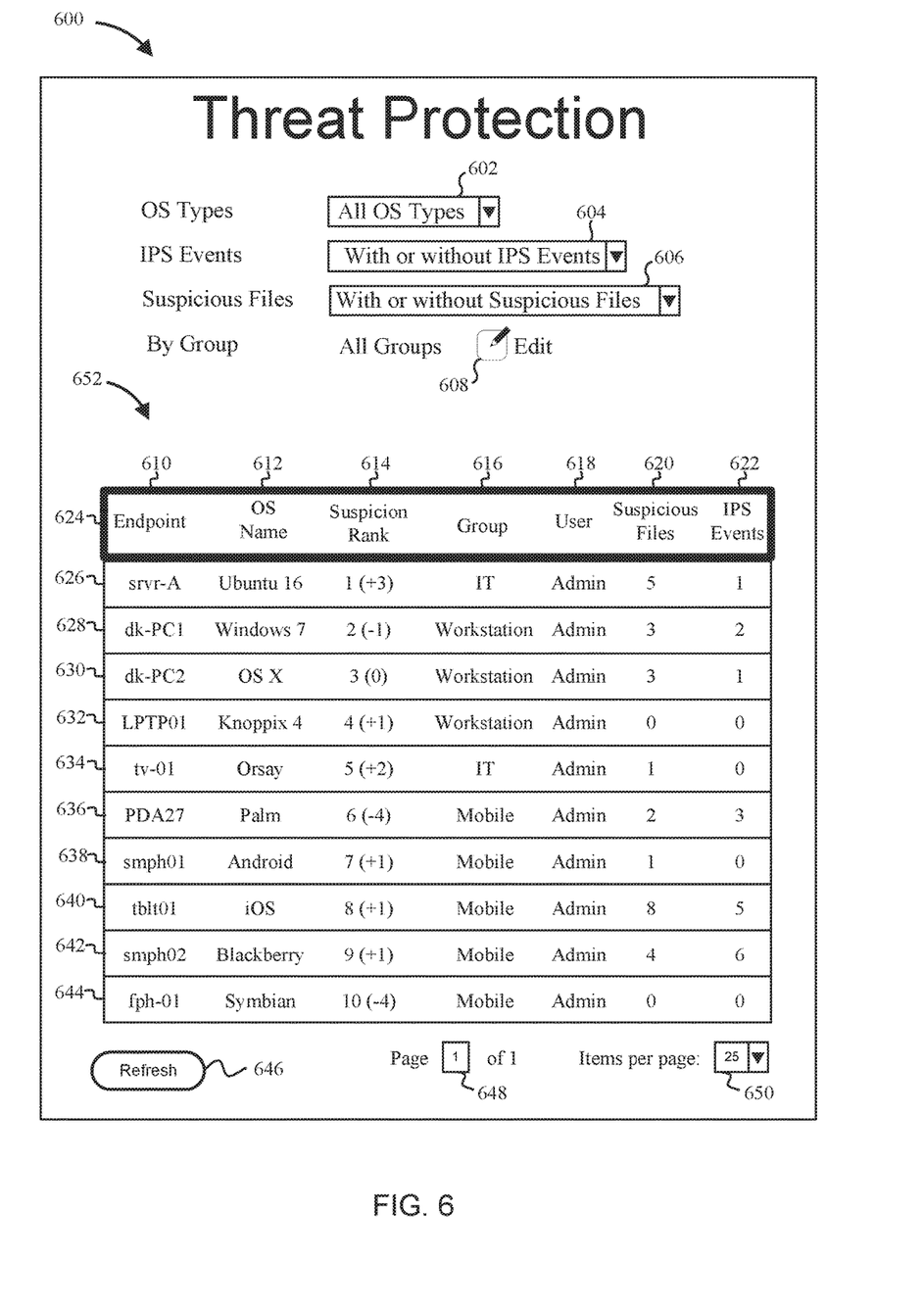
FIG. 6 illustrates an example of a graphical user interface (GUI) allowing a user to interface with an endpoint ranker for a network, according to one embodiment.

FIG. 6 illustrates an example of a graphical user interface (GUI) 600 that can be provided to allow a user to interface with an endpoint ranker for a network, according to one embodiment. The GUI 600 can include a table 652 that presents a list of endpoints that are sorted according to suspicion score. Each of the rows 626-644 provides information about a specific endpoint in the network.

The table 652 includes a header row 624 that identifies what types of data are contained in each of the columns 610-622. For example, column 610 includes identifiers for the listed endpoints and column 612 includes the names of the operating systems running on the endpoints. When a user clicks in field 602, a drop-down menu may allow the user to specify that only endpoints running certain operating systems should be displayed in the table.

Column 614 includes the suspicion rankings for the endpoints. In the example of FIG. 6, suspicion rank decreases as suspicion score increases. Hence, the endpoint with a suspicion rank of 1 (the endpoint associated with the identifier "srvr-A") is the endpoint with the highest suspicion score in the table 652. As shown, column 614 includes a number for each endpoint indicating how many places the suspicion rank has changed since the last time the table 652 was updated.

Column 616 indicates groups to which the endpoints in the table 652 belong. Upon clicking on the button 608, a user may be shown a menu that allows the user to specify that only endpoints belonging to certain specified groups should be displayed in the table 652.

Column 618 indicates users that are currently logged on to the endpoints. Column 620 can indicate the number of suspicious files that are currently stored or used on each endpoint in the table 652. Upon clicking on the arrow of the field 604, a user may be shown a drop-down menu that allows the user to specify that only endpoints that are storing or using suspicious files should be displayed in the table 652.

Column 622 indicates the number of intrusion protection system (IPS) events (e.g., symptomatic events) that have occurred at each endpoint in the table 652. Upon clicking on the arrow of the field 606, a user may be shown a drop-down menu that allows the user to specify that only endpoints on which certain types of events have occurred should be displayed in the table 652.

The page indicator 648 indicates which page of ranked endpoints is currently being displayed in the table 652. Box 650 can allow a user to specify how many rows for endpoints should be displayed in the table 652 at a time. The user can click the refresh button 646 to signal the endpoint ranker to recalculate the suspicion scores for endpoints in the network.

Figure 7:
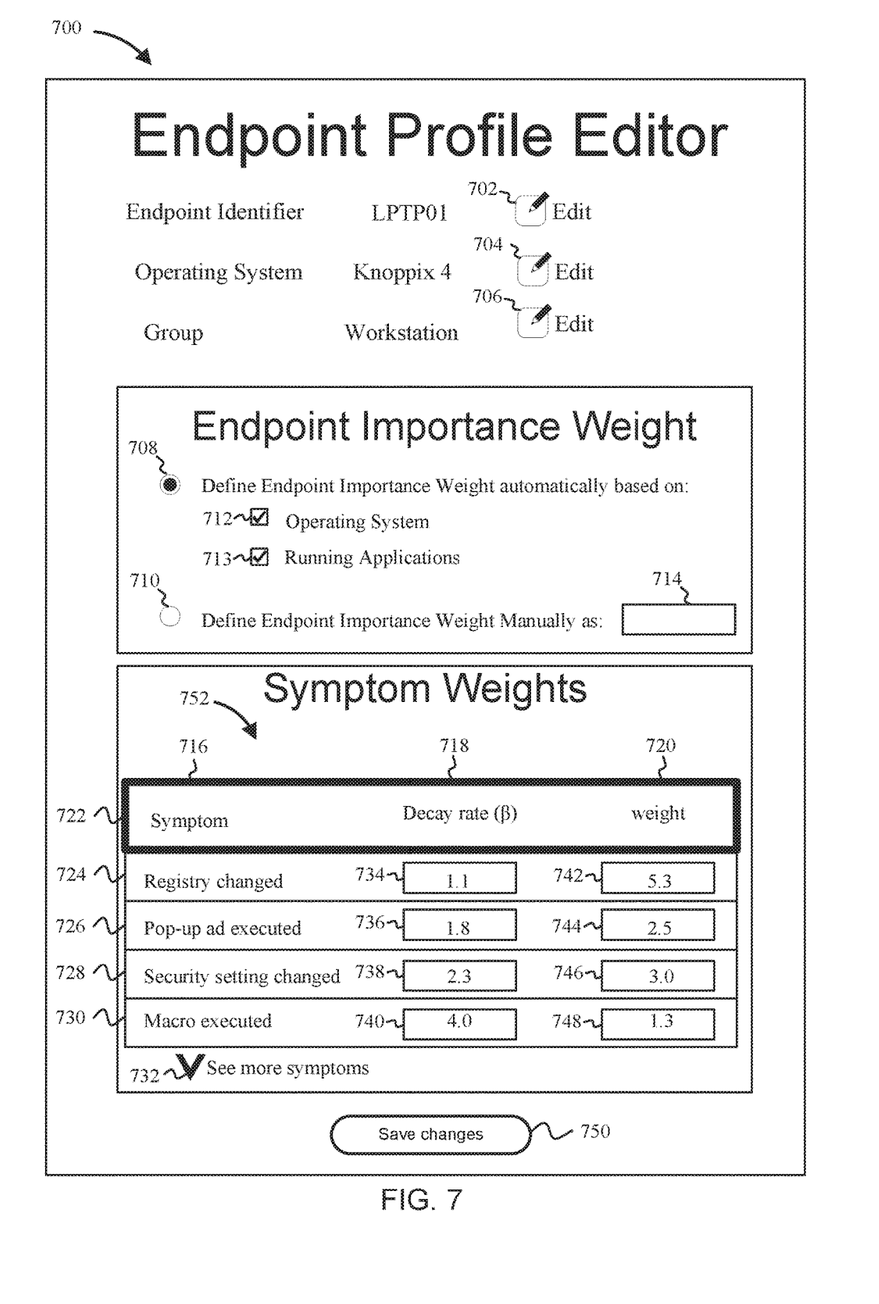
FIG. 7 illustrates an example of a graphical user interface (GUI) allowing a user to edit an endpoint profile, according to one embodiment.

FIG. 7 illustrates an example of a graphical user interface (GUI) 700 that can be provided to allow a user to edit an endpoint profile for an endpoint in a network that includes an endpoint ranker, according to one embodiment.

Upon clicking on the button 702, a user may be shown a menu that allows the user to edit an identifier associated with the endpoint in the network. In addition, upon clicking the button 704, the user may be shown a menu that allows the user to specify an operating system running on the endpoint. Furthermore, upon clicking the button 706, the user may be shown a menu that allows the user to specify a group to which the endpoint belongs.

The radio buttons 708 and 710 can allow a user to select how an endpoint-importance weight for the endpoint is determined. If radio button 708 is selected (as shown), the endpoint importance weight can be determined using a function. The checkbox 712 can be used to indicate that the operating system running at the endpoint is to be used as an input parameter for the function, while the checkbox 713 can be used to indicate that applications running at the endpoint should be used as input parameters for the function. Conversely, if the radio button 710 is selected, the user can manually enter the endpoint importance weight into the field 714.

The table 752 can include a header row 722 that identifies what types of data are contained in each of the columns 716-720. For example, column 716 includes symptom types for symptoms described by the rows 724-730. Column 718 specifies decay rates associated with the symptom types. The contribution of an event to the endpoint's suspicion score can be reduced over time based on the decay rate associated with the symptom type of the event. For example, if an event is a registry change, the event's contribution to the suspicion score for the endpoint can decay exponentially based on the decay rate "1.1" shown in field 734.

Column 720 specifies weights associated with the symptom types. The weight associated with a symptom type can be used as a coefficient that helps determine how much events of the symptom type contribute to the suspicion score for the endpoint device. For example, if an event is that a pop-up ad was executed, the applicable weight for the pop-up-ad event can be "2.5" as shown in field 744.

In order to edit the decay rates for symptom types, a user can click on any of the fields 734-740 and enter an updated decay rate as desired. In order to edit the weights for symptom types, the user can click on any of the fields 742-748 and enter an updated weight as desired. If there are additional symptom types that the user wishes to inspect, the user can click on the arrow icon 732 in order to signal the GUI 700 to display additional rows in the table 752 for the additional symptom types. Furthermore, the user can click on the button 750 to save changes that the user has made to decay rates or weights.

Figure 8:
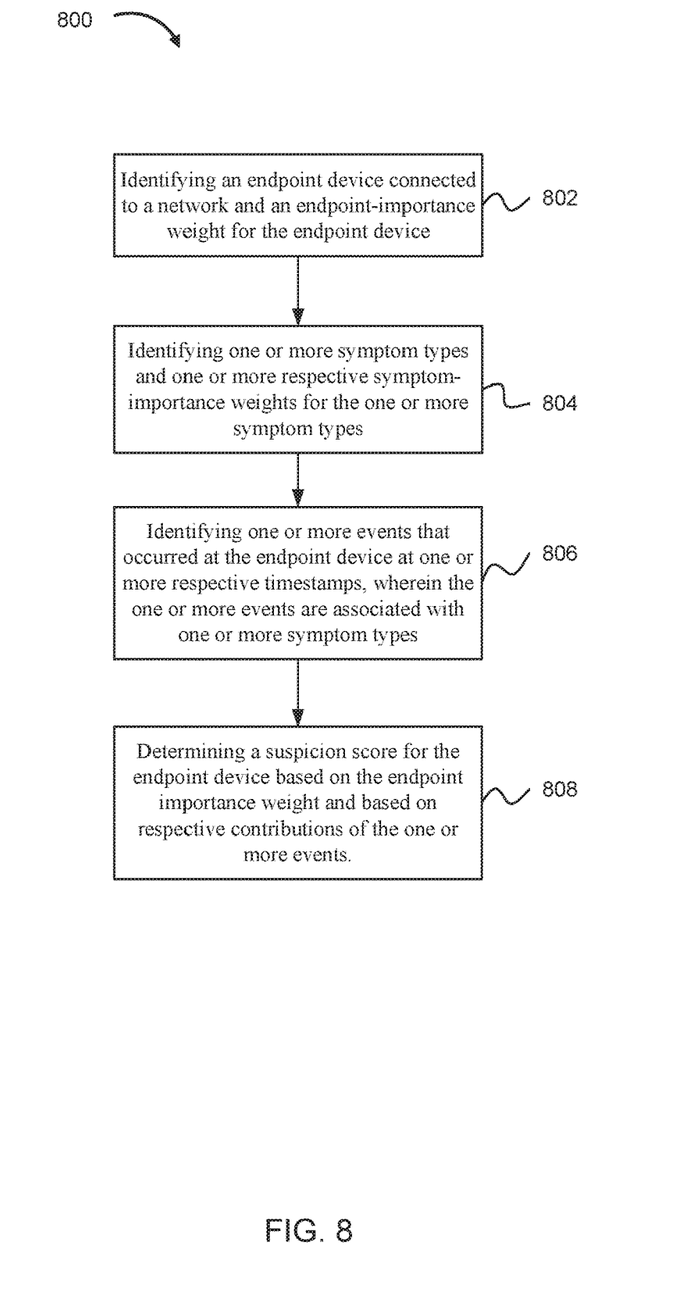
FIG. 8 illustrates a process for determining a suspicion score for an endpoint device, according to one embodiment.

FIG. 8 illustrates a process 800 for determining a suspicion score for an endpoint device, according to one embodiment. The process 800 can be implemented as a method or can be executed as instructions on a machine (e.g., by one or more processors), where the instructions are included on at least one computer-readable storage medium (e.g., a transitory or non-transitory computer-readable storage medium).

At block 802, an endpoint ranker program can identify an endpoint device connected to a network and an endpoint-importance weight for the endpoint device. In some examples, the endpoint ranker program can also determine the endpoint-importance weight based on an operating system running on the endpoint device or based on one or more applications running on the endpoint device.

At block 804, the endpoint ranker program identifies one or more symptom types and one or more respective symptom-importance weights for the one or more symptom types. In some examples, the endpoint ranker program can receive the endpoint-importance weight or the one or more respective symptom-importance weights from a user via an input device.

At block 806, the endpoint ranker program identifies one or more events that occurred at the endpoint device at one or more respective timestamps, wherein the one or more events are associated with one or more symptom types.

At block 808, the endpoint ranker program determines a suspicion score for the endpoint device based on the endpoint importance weight and based on respective contributions of the one or more events. In some examples, the endpoint ranker program calculates a sum of event contributions. The endpoint ranker program can also normalize the sum of event contributions using a sum of the symptom-importance weights.

The endpoint ranker program reduces a contribution of an event to the suspicion score based on an amount of time elapsed since a timestamp at which the event occurred. Specifically, the endpoint ranker program may exponentially decay the contribution based on the amount of time elapsed since the timestamp at which the event occurred and based on the rate of decay associated with the symptom type of the event.

Furthermore, the contribution of the event can be scaled based on a symptom-importance weight for a symptom type associated with the event.

In addition, in some embodiments, the endpoint ranker program can block the endpoint device from performing a suspicious action based on the suspicion score. A suspicious action can be an action that, if performed, would result in a symptomatic event. The endpoint ranker program can block the suspicion action by signaling the device not to perform the action or by refusing to allow the endpoint device to use some resource that is needed to complete the action.

Figure 9:
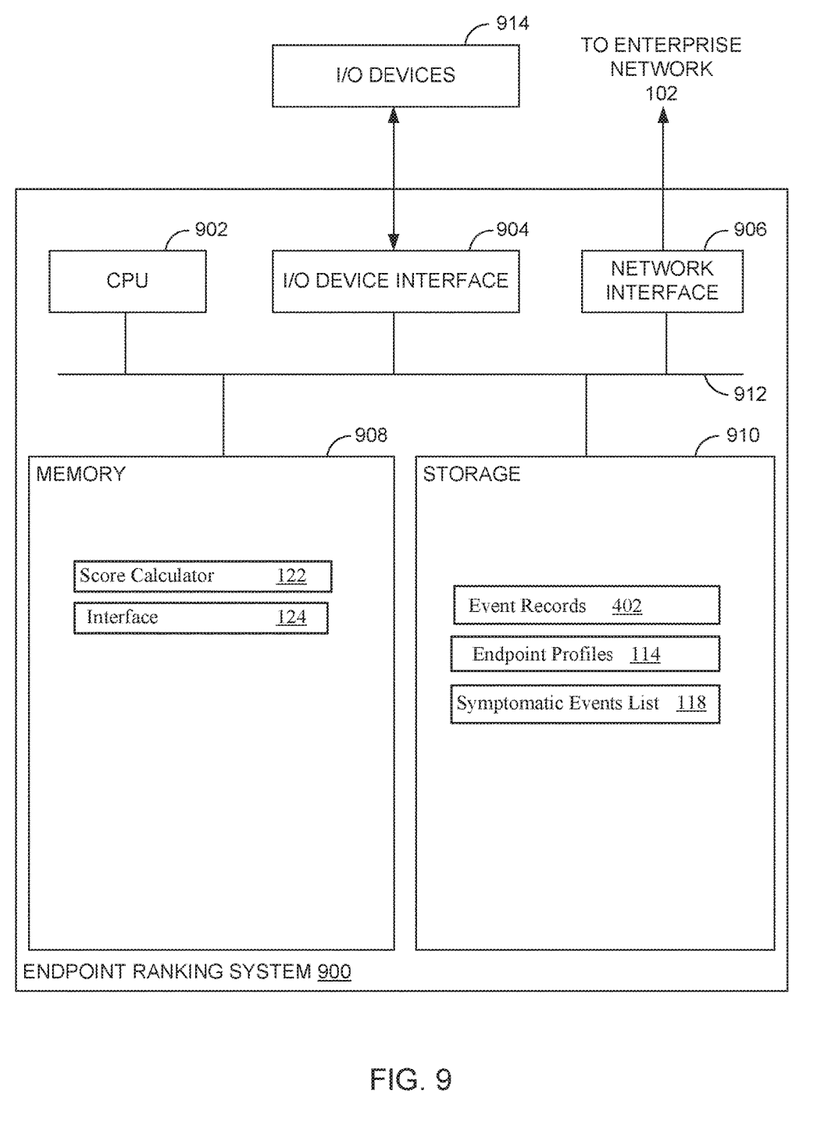
FIG. 9 illustrates an example endpoint ranking system that can rank endpoints in an enterprise network, according to one embodiment.

FIG. 9 illustrates an example endpoint ranking system 900 that ranks endpoints in an enterprise network, according to one embodiment. As shown, the endpoint ranking system 900 includes, without limitation, a central processing unit (CPU) 902, one or more input/output (I/O) device interfaces 904 which may allow for the connection of various I/O devices 914 (e.g., keyboards, displays, mouse devices, pen input, etc.) to the endpoint ranking system 900, network interface 906, a memory 908, storage 910, and an interconnect 912.

CPU 902 may retrieve and execute programming instructions stored in the memory 908. Similarly, the CPU 902 may retrieve and store application data residing in the memory 908. The interconnect 912 transmits programming instructions and application data, among the CPU 902, I/O device interface 904, network interface 906, memory 908, and storage 910. CPU 902 can represent a single CPU, multiple CPUs, a single CPU having multiple processing cores, and the like. Additionally, the memory 906 represents random access memory. Furthermore, the storage 910 may be a disk drive. Although shown as a single unit, the storage 910 may be a combination of fixed and/or removable storage devices, such as fixed disc drives, removable memory cards or optical storage, network attached storage (NAS), or a storage area-network (SAN).

As shown, memory 908 includes a score calculator 122 and an interface 124. The score calculator 122 can calculate suspicion scores for endpoint devices based on the endpoint profiles 114 and the symptomatic events list 118. The interface 124 may be a graphical user interface (GUI), a command-line interface, or some other type of interface that allows a user with administrative privileges to edit the endpoint profiles 114 and the score calculator 122.

As shown, storage 810 includes the endpoint profiles 114, the event records 402, and the symptomatic events list 118. Each of the endpoint profiles 302 can correspond to an endpoint that is connected to the enterprise network. Each of the endpoint profiles 114 can include an application list of applications that run on the endpoint and an operating system attribute that identifies an operating system that runs on the endpoint. Furthermore, each of the endpoint profiles 114 can include an endpoint importance weight for its respective endpoint.

Furthermore, each of the endpoint profiles 114 can also include decay rates. Each decay rate can be associated with a symptom type. Each event in the symptomatic events list can be associated with a symptom type. Each of the endpoint profiles 114 can also include symptom weights. Each symptom weight can be associated with a symptom type.

While the foregoing is directed to embodiments of the present disclosure, other and further embodiments of the disclosure may be devised without departing from the basic scope thereof, and the scope thereof is determined by the claims that follow.

What is claimed is:

1. A method for determining a suspicion score for an endpoint device, the method comprising:
    identifying the endpoint device connected to a network;
    determining an endpoint-importance weight for the endpoint device based on received input parameters indicating one or more applications running on the endpoint device, by summing a hashed value associated with the name of an operating system of the endpoint device with hashed values for names of the one or more applications running on the endpoint device;
    determining one or more symptoms on the endpoint device;
    identifying one or more symptom types associated with the one or more symptoms and one or more respective symptom-importance weights for the one or more symptom types;
    identifying one or more events that occurred at the endpoint device at one or more respective timestamps, wherein the one or more events are associated with the one or more symptom types;
    determining at least one event of the one or more events is an event internal to the endpoint device, wherein the event internal to the endpoint device is associated with an internal symptom type;
    calculating the suspicion score for the endpoint device based on the endpoint-importance weight, on respective contributions of the one or more events, and on the event internal to the endpoint device, wherein a contribution of an event to the suspicion score is reduced based on an amount of time elapsed since a timestamp at which the event occurred, and wherein the contribution of the event is scaled based on a symptom-importance weight for a symptom type associated with the event; and
    blocking the endpoint device from performing an action based on the suspicion score.

2. The method of claim 1, wherein calculating the suspicion score for the endpoint device includes exponentially decaying the event's contribution based on the amount of time elapsed since the timestamp at which the event occurred and based on a rate of decay associated with the symptom type associated with the event.

3. The method of claim 1, wherein calculating the suspicion score for the endpoint device includes:
    calculating a sum of event contributions; and
    normalizing the sum of event contributions using a sum of the symptom-importance weights.

4. The method of claim 1, further comprising:
    calculating suspicion scores for a plurality of endpoint devices on the network; and
    ranking the plurality of endpoint devices on the network based on the suspicion scores.

5. The method of claim 1, further comprising:
    presenting the suspicion score on a display as part of a list of suspicion scores for endpoint devices on the network.

6. The method of claim 1, further comprising:
    receiving the endpoint-importance weight or the one or more respective symptom-importance weights via an input device.

7. A non-transitory computer-readable storage medium containing instructions that, when executed by one or more processors, perform an operation for determining a suspicion score for an endpoint device, the operation comprising:
    identifying the endpoint device connected to a network;
    determining an endpoint-importance weight for the endpoint device based on received input parameters indicating one or more applications running on the endpoint device, by summing a hashed value associated with a name of an operating system of the endpoint device with hashed values for names of the one or more applications running on the endpoint device;
    determining one or more symptoms on the endpoint device;
    identifying one or more symptom types associated with the one or more symptoms and one or more respective symptom-importance weights for the one or more symptom types;
    identifying one or more events that occurred at the endpoint device at one or more respective timestamps, wherein the one or more events are associated with the one or more symptom types;
    determining at least one event of the one or more events is an event internal to the endpoint device, wherein the event internal to the endpoint device is associated with an internal symptom type;
    calculating the suspicion score for the endpoint device based on the endpoint-importance weight, on respective contributions of the one or more events, and on the event internal to the endpoint device, wherein a contribution of an event to the suspicion score is reduced based on an amount of time elapsed since a timestamp at which the event occurred, and wherein the contribution of the event is scaled based on a symptom-importance weight for a symptom type associated with the event; and
    blocking the endpoint device from performing an action based on the suspicion score.

8. The non-transitory computer-readable storage medium of claim 7, wherein calculating the suspicion score for the endpoint device includes exponentially decaying the event's contribution based on the amount of time elapsed since the timestamp at which the event occurred and based on a rate of decay associated with the symptom type associated with the event.

9. The non-transitory computer-readable storage medium of claim 7, wherein calculating the suspicion score for the endpoint device includes:
    calculating a sum of event contributions; and
    normalizing the sum of event contributions using a sum of the symptom-importance weights.

10. The non-transitory computer-readable storage medium of claim 7, wherein the operation further comprises:
    calculating suspicion scores for a plurality of endpoint devices on the network; and
    ranking the plurality of endpoint devices on the network based on the suspicion scores.

11. The non-transitory computer-readable storage medium of claim 7, wherein the operation further comprises:
    presenting the suspicion score on a display as part of a list of suspicion scores for endpoint devices on the network.

12. The non-transitory computer-readable storage medium of claim 7, wherein the operation further comprises:
  receiving the endpoint-importance weight or the one or more respective symptom-importance weights via an input device.

13. A system comprising:
  one or more processors; and
  memory storing one or more applications that, when executed on the one or more processors, perform an operation, the operation comprising:
    identifying an endpoint device connected to a network;
    determining an endpoint-importance weight for the endpoint device based on received input parameters indicating one or more applications running on the endpoint device, by summing a hashed value associated with a name of an operating system of the endpoint device with hashed values for names of the one or more applications running on the endpoint device;
    identifying one or more symptom types associated with the one or more symptoms and one or more respective symptom-importance weights for the one or more symptom types;
    identifying one or more events that occurred at the endpoint device at one or more respective timestamps, wherein the one or more events are associated with the one or more symptom types;
    determining at least one event of the one or more events is an event internal to the endpoint device, wherein the event internal to the endpoint device is associated with an internal symptom type;
    calculating a suspicion score for the endpoint device based on the endpoint-importance weight, on respective contributions of the one or more events, and on the event internal to the endpoint device, wherein a contribution of an event to the suspicion score is reduced based on an amount of time elapsed since a timestamp at which the event occurred, and wherein the contribution of the event is scaled based on a symptom-importance weight for a symptom type associated with the event; and
    blocking the endpoint device from performing an action based on the suspicion score.

14. The system of claim 13, wherein calculating the suspicion score for the endpoint device includes exponentially decaying the event's contribution based on the amount of time elapsed since the timestamp at which the event occurred and based on a rate of decay associated with the symptom type associated with the event.

15. The system of claim 13, wherein calculating the suspicion score for the endpoint device includes:
  calculating a sum of event contributions; and
  normalizing the sum of event contributions using a sum of the symptom-importance weights.

16. The system of claim 13, wherein the operation further comprises:
  calculating suspicion scores for a plurality of endpoint devices on the network; and
  ranking the plurality of endpoint devices on the network based on the suspicion scores.

17. The system of claim 13, wherein the operation further comprises:
  presenting the suspicion score on a display as part of a list of suspicion scores for endpoint devices on the network.

18. The system of claim 13, wherein the operation further comprises:
  receiving the endpoint-importance weight or the one or more respective symptom-importance weights via an input device.

* * * * *